W. Somers.
Weeding Instrument.
Nº 90,319.    Patented May 18, 1869.

Witnesses;
J. H. Shumway
A. J. Tibbits

Inventor;
Wm Somers
By his Attorney
John E. Earle

United States Patent Office.

WILLIAM SOMERS, OF BRIDGEPORT, ASSIGNOR TO HIMSELF AND GEORGE E. SOMERS, OF WATERBURY, CONNECTICUT.

Letters Patent No. 90,319, dated May 18, 1869.

IMPROVEMENT IN GARDEN-IMPLEMENT AND WEEDER.

The Schedule referred to in these Letters Patent and making part of the same.

To all whom it may concern:

Be it known that I, WILLIAM SOMERS, of Bridgeport, in the county of Fairfield, and State of Connecticut, have invented a new Improvement in Garden-Weeder and Implement; and I do hereby declare the following, when taken in connection with the accompanying drawings, and the letters of reference marked thereon, to be a full, clear, and exact description of the same, and which said drawings constitute part of this specification, and represent in—

Figure 1:
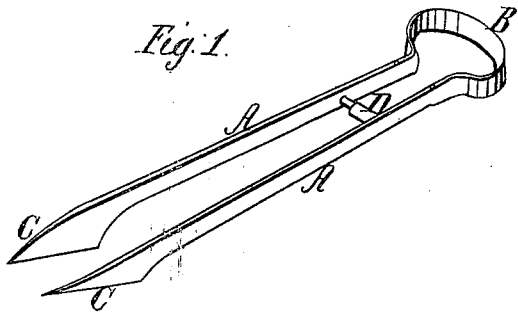
Figure 2:
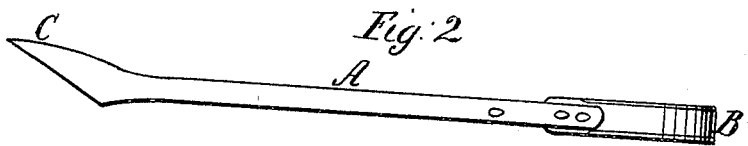

Figure 1, a perspective view, and in
Figure 2, a side view.

This invention relates to an improvement in implement for gardeners' use, it being designed for pulling weeds and loosening the ground around small plants, and similar use, and consists in a pair of arms attached at one end by a spring, and at the other end terminating in jaws at an angle to the arm, so that the operator, grasping the handles, the jaws are in convenient position for digging the ground, pulling weeds, &c. The spring of the instrument is formed with sharp edges to serve as a hoe.

In order to the clear understanding of my invention, I will fully describe the same as illustrated in the accompanying drawings.

A A are two arms, of light construction, their upper ends attached to or formed upon a spring, B, the two edges of the spring being sharpened, as seen in fig. 2, the other end of the arm being formed into pointed jaws, the edge of the jaws being at an angle to the arms, as denoted in fig. 2, the spring acting to hold the jaws asunder, as seen in fig. 1.

The instrument is taken in the hand of the gardener, his hand clasping both arms, so that he can conveniently close the jaws upon any weed which he desires to remove, the pointed end also serving as a convenient implement for loosening or digging the earth. The spring having sharp edges, is also convenient for use as a hoe.

The two jaws may be provided with a guide, D, if desired.

Having fully described my invention,

What I claim as new and useful, and desire to secure by Letters Patent, is—

The herein-described instrument for gardeners' use, consisting of the two arms A, attached together by a spring, B, at one end, and at the other formed into pointed jaws C, so as to operate in the manner substantially as set forth.

WILLIAM SOMERS.

Witnesses:
MORRIS TUTTLE,
H. T. BLAKE.